United States Patent
Reichert

(10) Patent No.: US 10,252,796 B2
(45) Date of Patent: Apr. 9, 2019

(54) ROTOR-BLOWN WING WITH PASSIVELY TILTING FUSELAGE

(71) Applicant: Kitty Hawk Corporation, Mountain View, CA (US)

(72) Inventor: Todd Reichert, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 308 days.

(21) Appl. No.: 15/232,606

(22) Filed: Aug. 9, 2016

(65) Prior Publication Data

US 2018/0044011 A1 Feb. 15, 2018

(51) Int. Cl.
*B64C 11/28* (2006.01)
*B64C 29/00* (2006.01)
*B64C 39/08* (2006.01)

(52) U.S. Cl.
CPC .......... *B64C 29/0033* (2013.01); *B64C 11/28* (2013.01); *B64C 39/08* (2013.01)

(58) Field of Classification Search
CPC ......... B64C 29/0033; B64C 5/16; B64C 9/12; B64C 15/12; B64C 25/52; B64C 39/024
See application file for complete search history.

(56) References Cited

U.S. PATENT DOCUMENTS

| | | | |
|---|---|---|---|
| 1,165,770 A | 12/1915 | Gallaudet | |
| 1,704,076 A | 3/1929 | Carroll | |
| 2,711,868 A | 6/1955 | Parker | |
| 2,952,422 A | 9/1960 | Fletcher | |
| 3,181,810 A * | 5/1965 | Olson | B64C 29/0033 244/66 |
| 3,259,343 A * | 7/1966 | Roppel | B64C 29/0075 244/12.4 |
| 3,350,035 A * | 10/1967 | Schlieben | B64C 29/02 244/34 R |
| 3,592,412 A * | 7/1971 | Glatfelter | B64C 29/0033 244/7 A |
| 4,484,721 A | 11/1984 | Gue | |

(Continued)

FOREIGN PATENT DOCUMENTS

WO WO 2014067563 * 5/2014
WO WO-2016109408 7/2016

OTHER PUBLICATIONS

Author Unknown, Tail-sitter, from Wikipedia, the free encyclopedia, downloaded from https://en.wikipedia.org/wiki/Tail-sitter, last modified Mar. 23, 2016.

(Continued)

*Primary Examiner* — Justin M Benedik
(74) *Attorney, Agent, or Firm* — Van Pelt, Yi & James LLP

(57) ABSTRACT

An aircraft includes a wing where a first rotor and a second rotor are coupled to the wing at a fixed position relative to the wing. The aircraft also includes a fuselage and a bearing. The bearing mechanically couples the wing and the fuselage and permits the wing and the fuselage to rotate with respect to each other about an axis of rotation. The bearing permits the fuselage to rotate under the influence of gravity to be in a same orientation relative to ground when the wing is in a first orientation relative to the ground as well as a second orientation relative to the ground.

11 Claims, 9 Drawing Sheets

Not Necessarily to Scale

(56) References Cited

U.S. PATENT DOCUMENTS

| | | | |
|---|---|---|---|
| 4,982,914 | A | 1/1991 | Eickmann |
| 5,280,863 | A | 1/1994 | Schmittle |
| 5,405,105 | A | 4/1995 | Kress |
| 5,725,709 | A | 3/1998 | Jensen |
| 6,402,088 | B1* | 6/2002 | Syrovy ............... B64C 27/18 244/10 |
| 8,152,096 | B2* | 4/2012 | Smith ............... B64C 29/0033 244/12.4 |
| 8,505,846 | B1* | 8/2013 | Sanders, II ............ B64C 29/02 244/7 A |
| 8,733,690 | B2* | 5/2014 | Bevirt ............... B64C 29/0033 244/12.4 |
| 9,120,560 | B1* | 9/2015 | Armer ............... B64C 29/0008 |
| 9,187,174 | B2* | 11/2015 | Shaw ............... B64C 27/28 |
| 9,944,386 | B1 | 4/2018 | Reichert |
| 10,059,436 | B1 | 8/2018 | Robertson |
| 10,081,422 | B1 | 9/2018 | Reichert |
| 10,086,931 | B2 | 10/2018 | Reichert |
| 2002/0096600 | A1 | 7/2002 | Richards |
| 2003/0062443 | A1* | 4/2003 | Wagner ............... B64C 3/56 244/12.3 |
| 2004/0245374 | A1* | 12/2004 | Morgan ............... B64C 5/02 244/12.3 |
| 2005/0230519 | A1 | 10/2005 | Hurley |
| 2006/0060701 | A1 | 3/2006 | Richards |
| 2006/0081732 | A1 | 4/2006 | From |
| 2009/0049757 | A1 | 2/2009 | Potter |
| 2010/0072325 | A1 | 3/2010 | Sambell |
| 2012/0234968 | A1* | 9/2012 | Smith ............... B64C 29/0033 244/12.3 |
| 2013/0020429 | A1* | 1/2013 | Kroo ............... B64C 3/16 244/6 |
| 2018/0057155 | A1 | 3/2018 | Reichert |
| 2018/0244364 | A1 | 8/2018 | Fenny |

OTHER PUBLICATIONS

Author Unknown, Tiltwing, from Wikipedia, the free encyclopedia, downloaded from https://en.wikipedia.orgiwiki/Tiltwing, last modified May 26, 2015.

* cited by examiner

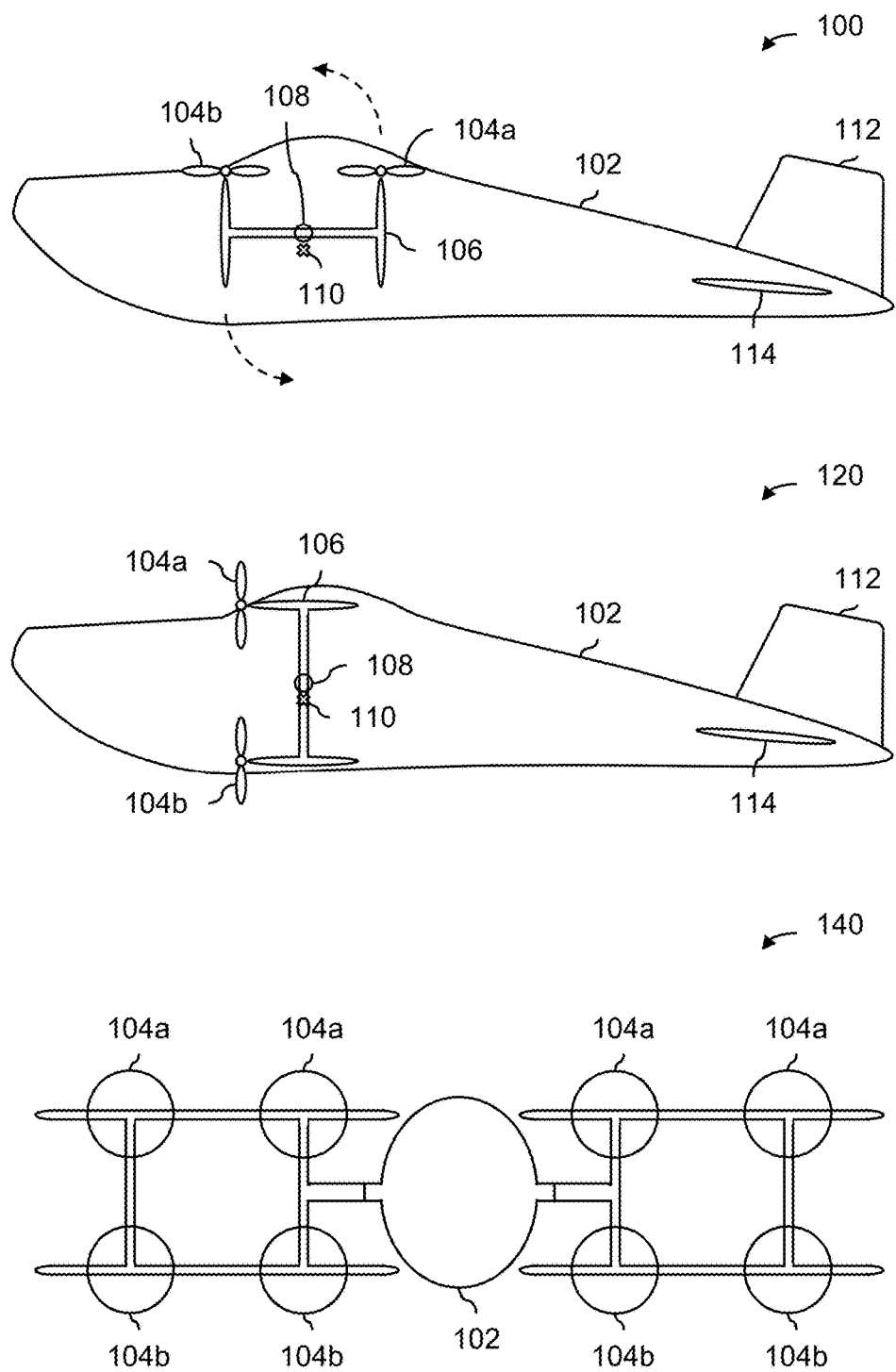
FIG. 1A   Not Necessarily to Scale

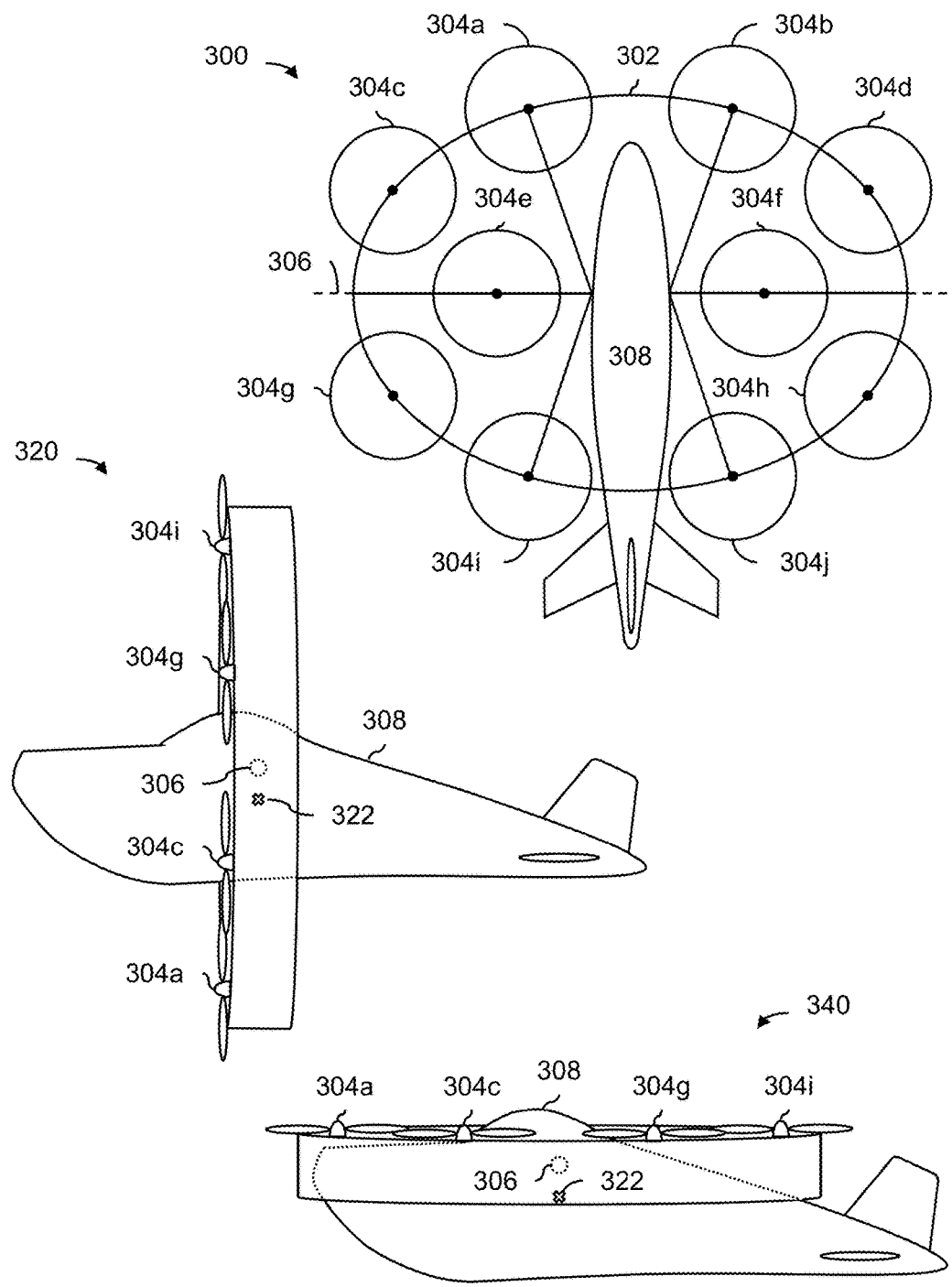
FIG. 3  Not Necessarily to Scale

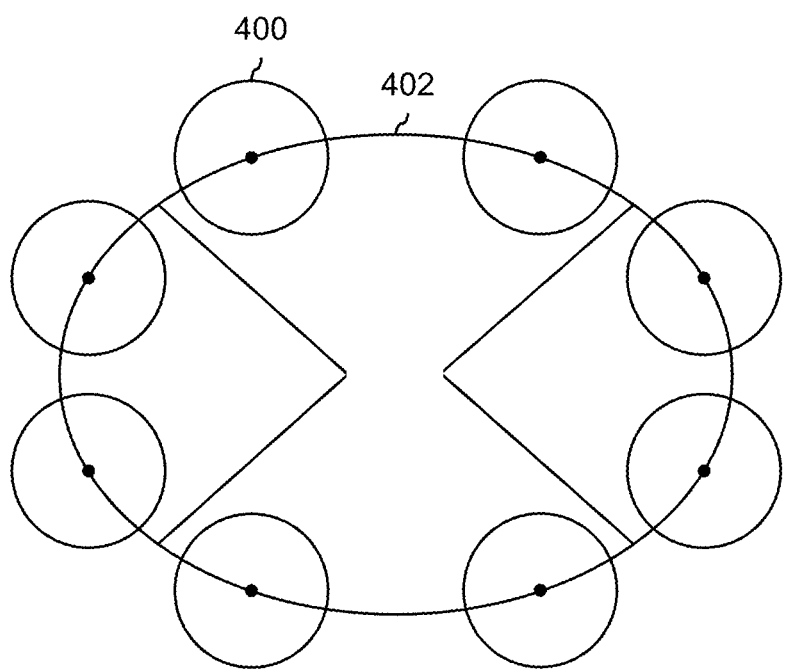
FIG. 4  Not Necessarily to Scale

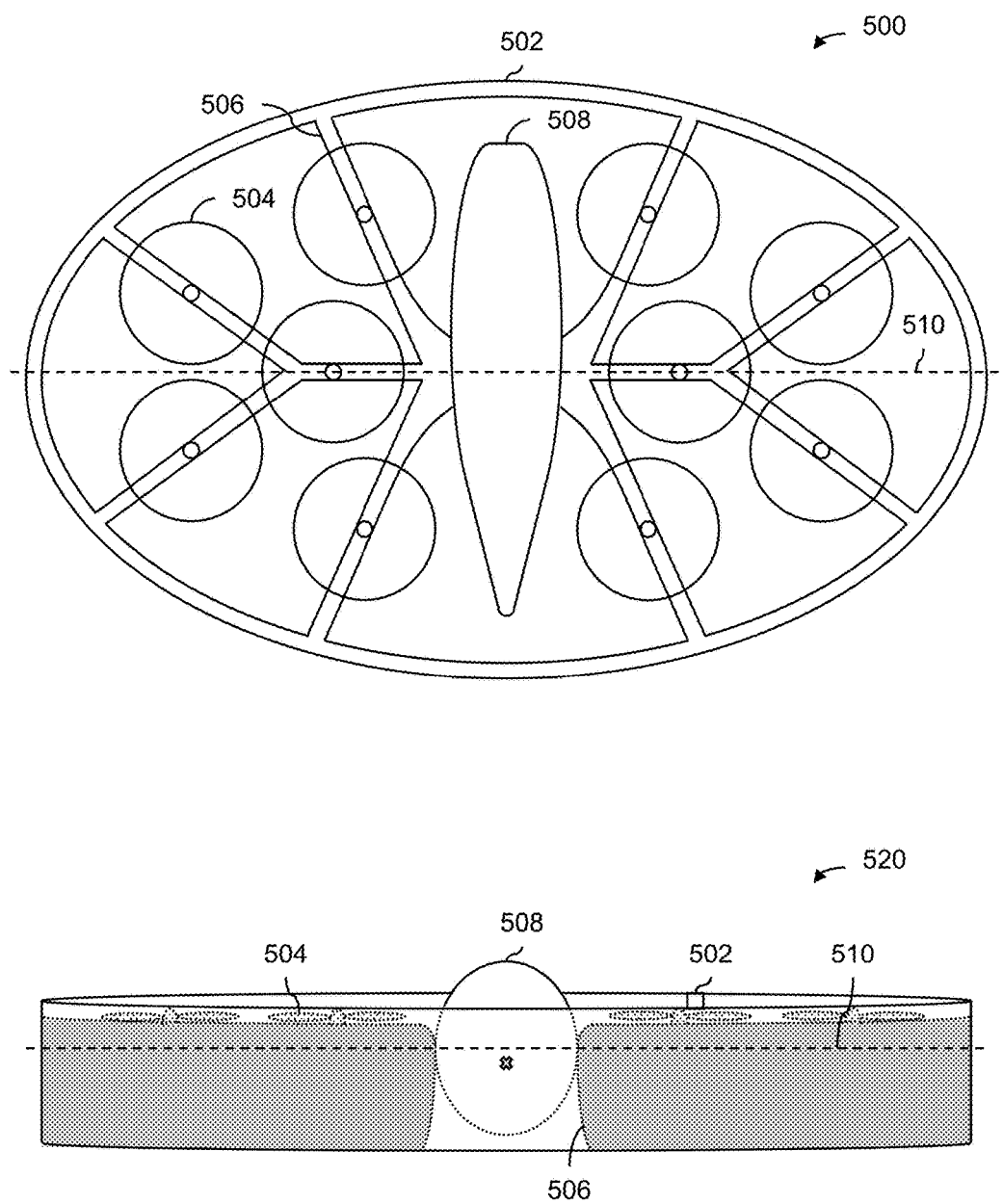
FIG. 5  Not Necessarily to Scale

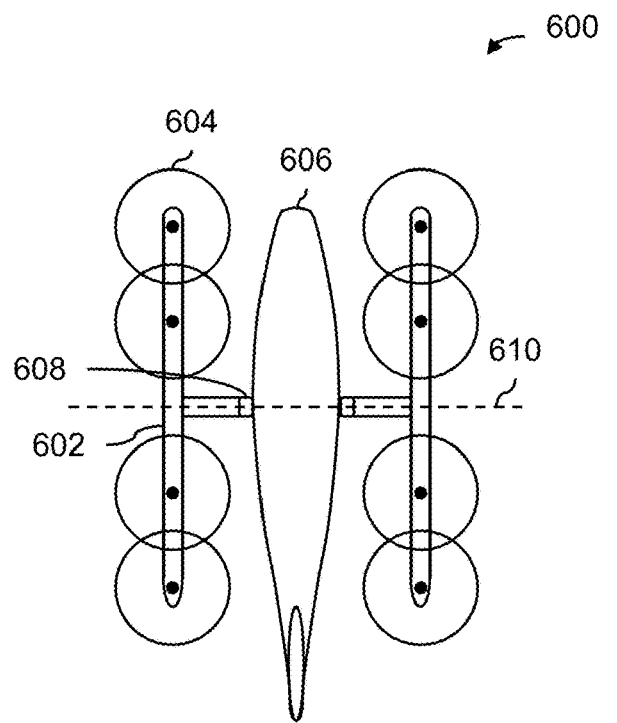
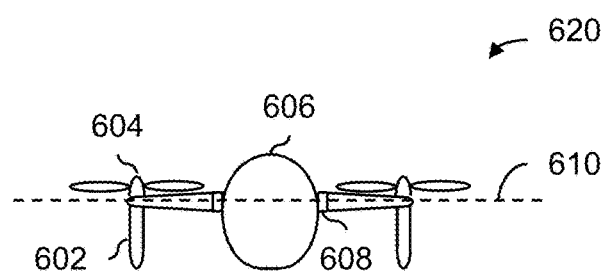
FIG. 6  Not Necessarily to Scale

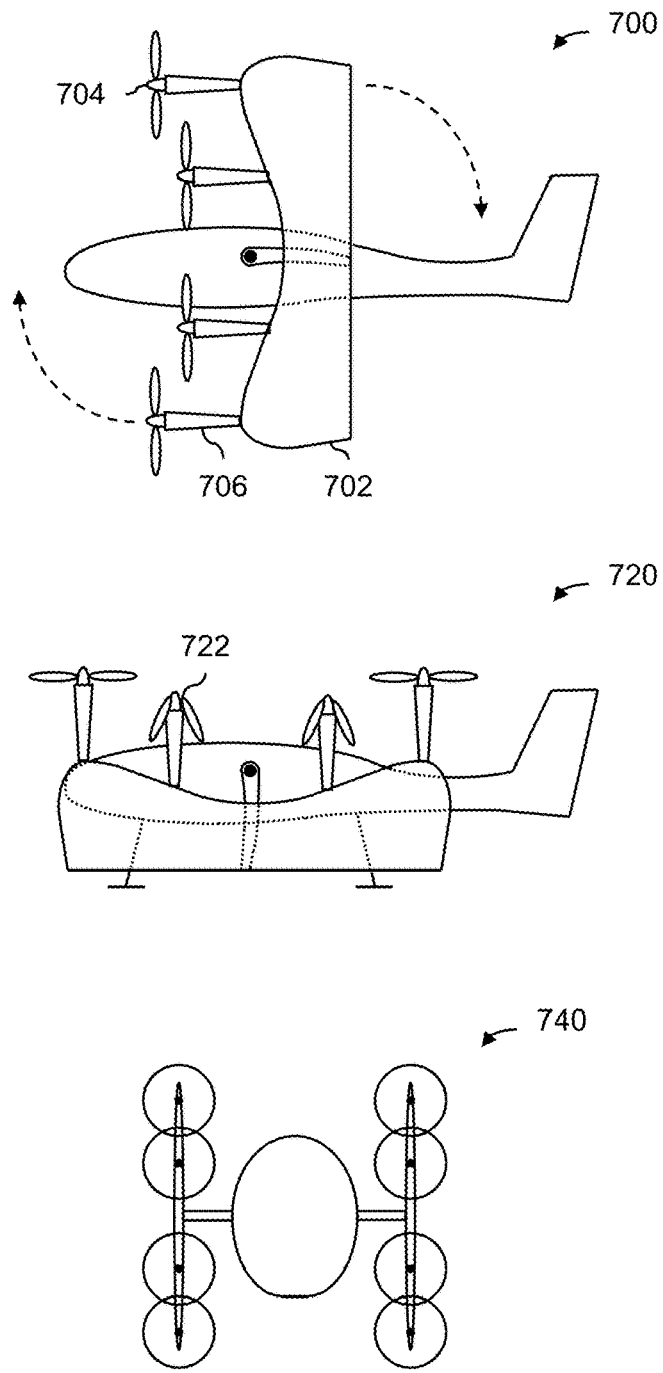
FIG. 7  Not Necessarily to Scale

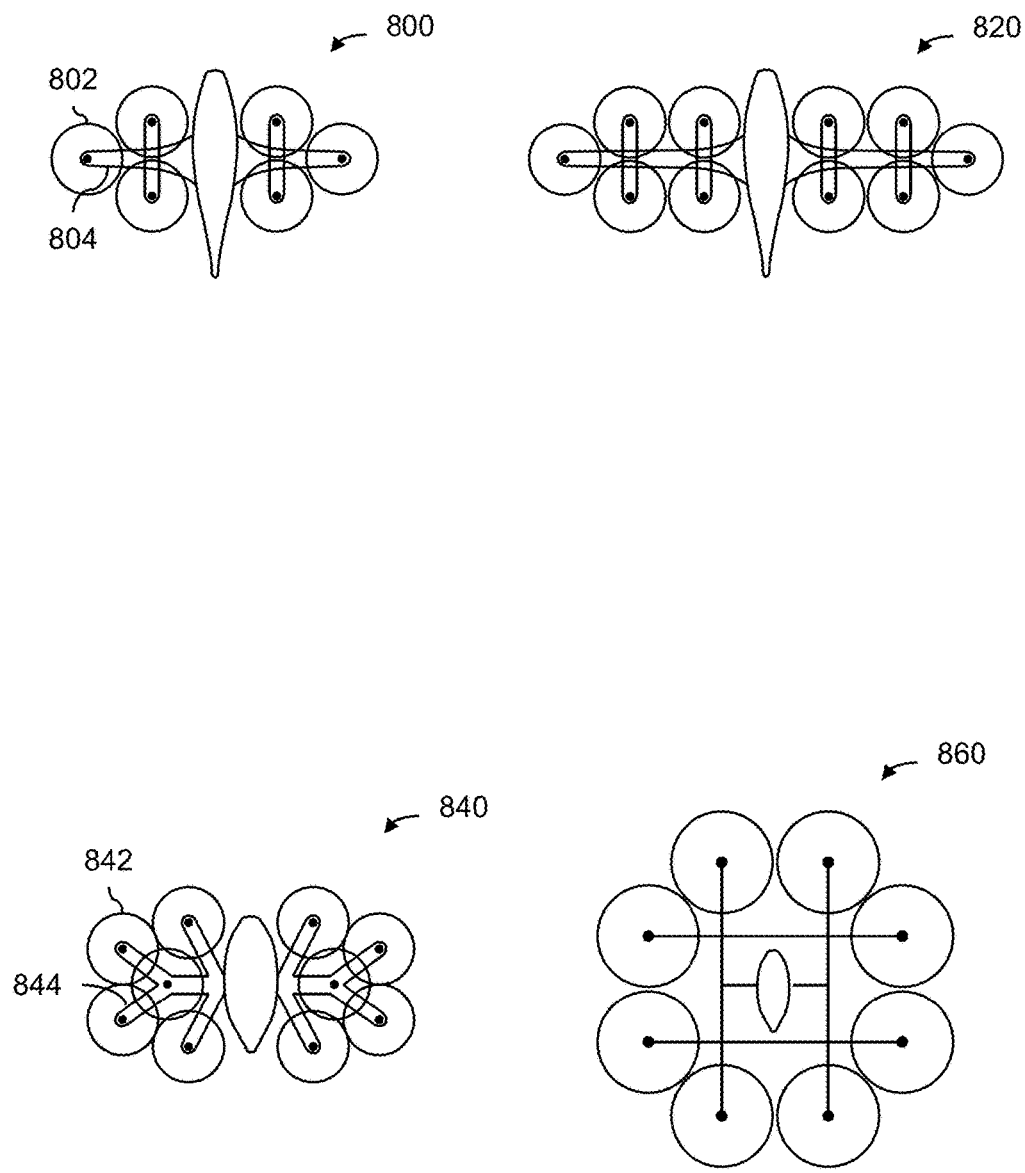
FIG. 8    Not Necessarily to Scale

ROTOR-BLOWN WING WITH PASSIVELY TILTING FUSELAGE

BACKGROUND OF THE INVENTION

One type of vertical takeoff and landing (VTOL) aircraft, the tail-sitter, takes off and lands from a position sitting on its tail end, with its nose in the air, and then transitions to a horizontal orientation for forward flight. For manned flight of a tail-sitter, the pilot typically sits in a forward-facing seat, resulting in the pilot facing nearly vertically straight up during takeoff and landing. New types of aircraft which combine the hovering performance of helicopters (e.g., with rotors rotating in the horizontal plane which provide vertical lift) and the forward flight performance of wing-mounted airplanes (e.g., with propellers spinning in the vertical plane where vertical lift comes from the airflow over the wings) but which also improve the flying experience would be desirable.

BRIEF DESCRIPTION OF THE DRAWINGS

Various embodiments of the invention are disclosed in the following detailed description and the accompanying drawings.

FIG. 1A is a diagram illustrating an embodiment of a biplane with a passively tilting fuselage.

FIG. 3 is a diagram illustrating an embodiment of an aircraft with a passively rotating fuselage as well as an annular wing with interior and edge rotors.

FIG. 4 is a diagram illustrating an embodiment of an annular wing with rotors attached only to the edge of the annular wing.

FIG. 5 is a diagram illustrating an embodiment of an aircraft with an annular wing with rotors attached only to the crossbars of an annular wing.

FIG. 6 is a diagram illustrating an embodiment of a top view and front view of an aircraft with an H-wing and a passively tilting fuselage.

FIG. 7 is a diagram illustrating side views of an exemplary H-wing aircraft with rotors attached to the wings via dowels.

FIG. 8 is a diagram illustrating a variety of aircraft with different types of rotor placements.

DETAILED DESCRIPTION

Figure 1B:
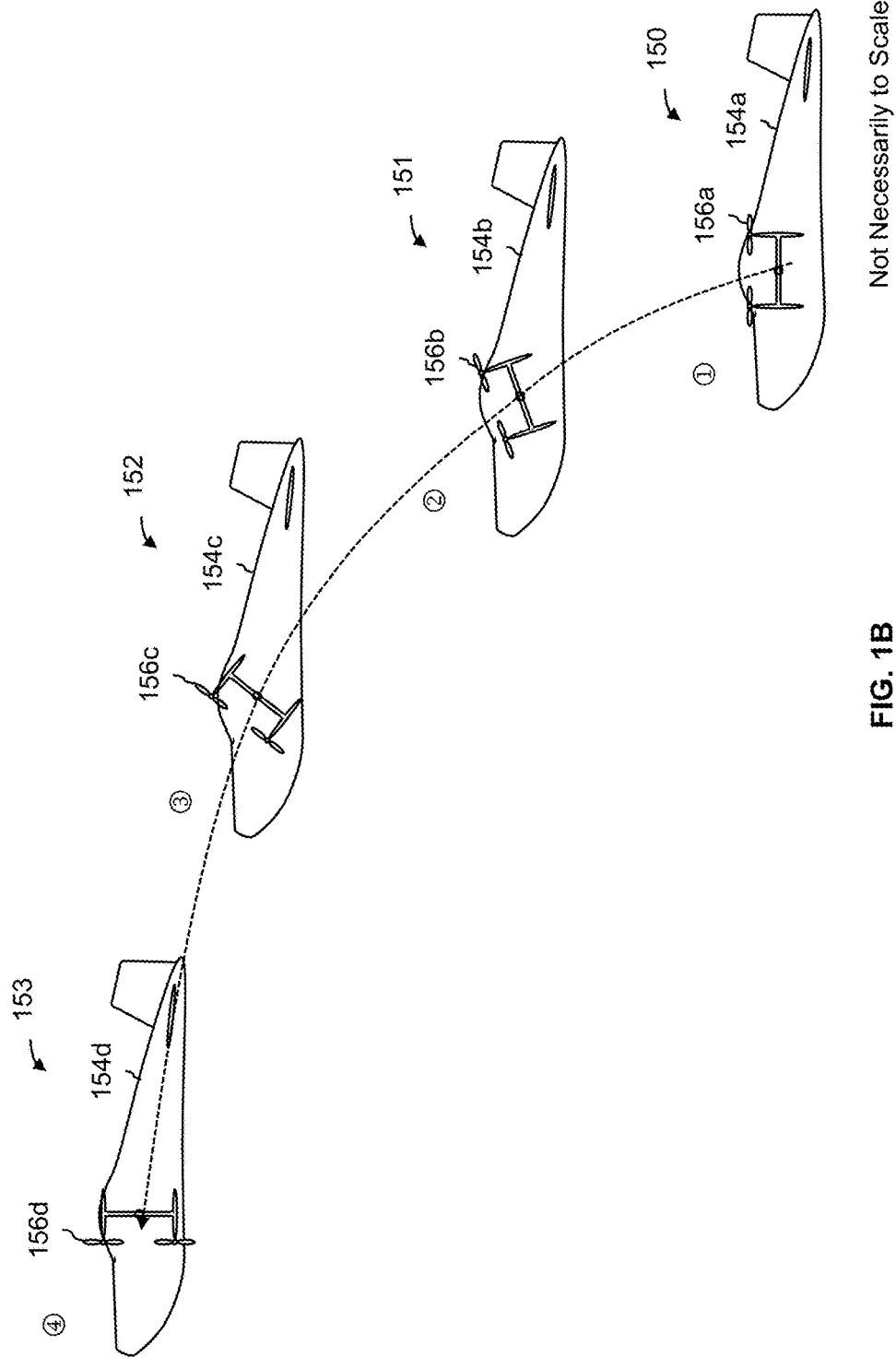
FIG. 1B is a diagram illustrating an embodiment of a biplane with a passively tilting fuselage changing from a hovering configuration to a forward flight configuration.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiment of an aircraft are described herein where the fuselage of the aircraft is able to passively remain in a same (e.g., level) position with respect to the ground, even as the wings of the aircraft switch between different orientations relative to the ground (e.g., a hovering mode where rotors on the wings rotate in the horizontal plane versus a forward flight mode where the rotors rotate in the vertical plane). A bearing mechanically couples the wing and the fuselage and permits the wing and the fuselage to rotate with respect to each other about an axis of rotation. Thus, as the wing switches from the first orientation to the second orientation (or vice versa), the bearing permits the fuselage to have the same orientation relative to ground (e.g., level). In one example, rotors are coupled or otherwise attached to the wing at fixed positions relative to the wing (e.g., they cannot be tilted) and the wings switch between different orientations or configurations by rotating the rotors at different speeds.

FIG. 1A is a diagram illustrating an embodiment of a biplane with a passively tilting fuselage. In this example, the wings of the aircraft are biplane-style wings but this design selection is merely exemplary and is not intended to be limiting. Similarly, the shape of the fuselage is merely exemplary and is not intended to be limiting. Other wing design examples and fuselage design example are described in more detail below.

Diagram 100 shows a side view of the exemplary biplane. To take off, the biplane starts in the position shown in diagram 100 with the leading edge of the biplane wings (106) pointing toward the sky. Rotors (104a and 104b) are mounted or otherwise attached to the edge of the biplane wings in a fixed manner (e.g., their position cannot be moved or angled with respect to the wings). Such rotors may be desirable because they are lighter, less expensive, and/or less complex than rotors which can be angled or moved (e.g., to steer the plane). The position of the biplane wing in diagram 100 therefore orients the rotors (104a and 104b) to be oriented so that they rotate in a horizontal plane. The rotors are sped up (e.g., at substantially the same speed to avoid creating a lift differential) to produce a vertical thrust which lifts the biplane vertically into the air. The biplane wings in this mode or configuration (e.g., shown in diagram 100) may be referred to as being in a hovering mode or in a hovering configuration since the rotors are oriented in a position that is better for (e.g., more efficient for) hovering as opposed to forward flight.

Flying the biplane with the configuration shown in diagram 100 may be desirable in some cases. For example, if the pilot wants to hover at a constant in-air position, then the configuration shown in diagram 100 may enable the biplane to more efficiently hover. Or, if the pilot wants to fly (mostly) straight up or straight down, then the configuration shown in diagram 100 may enable the biplane to more efficiently fly straight up or straight down. This is desirable because less power is consumed.

In some cases it may be desirable to have the rotors instead rotate in the vertical plane. See, for example, the position of the rotors 104a and 104b in diagram 120. When oriented as shown in diagram 120, the rotors provide horizontal thrust and the biplane has better forward flight performance (e.g., compared to the configuration shown in diagram 100). Therefore, if the pilot wishes to fly (substantially) forward, then putting the rotors into the position shown in diagram 120 enables the biplane to fly in an efficient manner. The configuration of the wings and/or rotors shown in diagram 120 may be referred to herein as a forward flight mode or forward flight configuration.

To go from the configuration shown in diagram 100 (e.g., a hovering configuration) to the configuration shown in diagram 120 (e.g., a forward flight configuration), one or more selected rotors are spun faster in order to create a differential in the vertical lift. Specifically, rotor 104a (and other rotors in the same row, not shown) is sped up so that it produces more vertical lift than rotor 104b (and other rotors in the same row, not shown). This creates a differential in the vertical lift which causes the aircraft to climb forwards and upwards such that the wings "fly around" the fuselage in a counterclockwise direction (e.g., from the side view shown in diagram 100 and diagram 120). An example of this is described in more detail below.

While the wings change from the position shown in diagram 100 to the position shown in diagram 120, the fuselage (102) remains in substantially same position because of the bearing (108) which permits the fuselage (102) and wings (106) to rotate with respect to each other. Therefore, as the wings and rotors "flip up" (in this example from a hovering configuration to a forward flight configuration), gravity will keep the fuselage in the same position (e.g., the fuselage will settle into a position where the center of mass is directly beneath the bearing). It is noted that this rotation of the fuselage (e.g., where the fuselage rotates with respect to the fuselage to remain level) is passive, not active.

To transition from the configuration shown in diagram 120 (e.g., a forward flight configuration) to the configuration shown in diagram 100 (e.g., a hovering configuration), rotor 104b (and possibly other rotors) is rotated faster than rotor 104a (and possibly other rotors). As will be described in more detail below, this induces external aerodynamic forces (e.g., as opposed to some internally applied force which causes a wing to rotate from the inside out) which causes the wing to switch from the forward flight wing position shown in diagram 120 to the hovering wing position shown in diagram 100.

In diagram 100 and diagram 120, center of mass 110 shows the center of mass of the fuselage (102), including the mass of the pilot. To make the aircraft more stable, the seat (not shown) in the fuselage is low enough so that the center of mass of the biplane with the pilot is seated is lower than axis of rotation (e.g., coming out of the page where bearing 108 is at) as is shown here. If the center of mass were higher than the axis of rotation, the fuselage might flip over, causing the pilot to be upside down. In some embodiments, to mitigate rocking at takeoff, the seat may be positioned so that the center of mass (e.g., once the pilot is seated) is directly beneath the bearing. If the center of mass is too far forward or too far back, the fuselage may swing to an excessive and/or undesirable degree at takeoff.

Diagram 140 shows a front view which corresponds to the side view shown in diagram 120. In this example, there are a total of eight rotors which are placed on the biplane wings at the cross bars. The four rotors on the top (104a) are the ones which are rotated faster compared to the four rotors on the bottom (104b) to switch from the configuration or position shown in diagram 100 to that shown in diagram 120. It is noted that the number and placement of rotors shown here is merely exemplary and is not intended to be limiting.

One benefit to the aircraft embodiments described herein is that they have both a hovering configuration and a forward flight configuration while permitting the pilot to remain in an upright and comfortable position the entire time. For example, a tail-sitter requires the pilot to be facing upwards during takeoff and less nimble pilots may find it difficult to maneuver themselves into the proper position. In that position, a pilot may also find it difficult to see the horizon, which makes taking off difficult (e.g., the aircraft may have minimal instrumentation to keep cost, weight, and/or complexity down). Also, a tail-sitter at takeoff typically requires specialized equipment such as a lift or a winch to position the tail-sitter so that it is sitting on its tail. In contrast, no specialized equipment is required to put the exemplary biplane (as an example) into some special or different takeoff position.

Another benefit to the aircraft embodiments described herein is that they use relatively simple rotors. In this example and other examples described below, steering or maneuvering of the aircraft is achieved by spinning up or spinning down selected rotors in order to achieve a differential in the horizontal thrust and/or a vertical lift, as opposed to moving the position of the rotor and/or the angle of the blade. For example, the rotors (104a and 104b) are fixed to the biplane wing (106) and there are no (as an example) cyclic controls which can adjust the roll or pitch (or, more generally, position) of the rotors relative to the wing. The position of the rotors relative to the wing remains fixed. Similarly, blades are at a fixed pitch angle and the angle is not adjustable. Using such rotors may be desirable because it reduces cost, weight, and/or design complexity.

Another benefit to the aircraft embodiments described herein is that there is no (as an example) hydro-mechanical part which rotates the fuselage and/or wings (e.g., from the inside of the wing). To put another way, the fuselage rotates passively, not actively, on the bearing due to gravity as the wing "flies around" the fuselage. Some other types of aircraft (such as tiltwings) have wings which are rotated using hydro-mechanical components which adds to the cost, weight, and/or design complexity. In contrast, the aircraft embodiments described herein do not so that they cost less, weight less, and/or are less complex.

In some embodiments, a bearing which connects the wings and the fuselage includes a damper. A damper in the bearing may prevent fast and/or excessive swinging of the fuselage which may produce an unpleasant flying experience. The final or steady state position of the fuselage with the damper is the same as without the damper, but the damper may cause the fuselage to more slowly change position (e.g., as the wings rotate between a hovering position and a forward flight position, or as the biplane flies around), producing a more pleasant flying experience.

In some embodiments, the wings and/or fuselage are able to be locked so that they cannot rotate around the bearing when the lock is engaged. For example, the wings and/or fuselage may be locked until the aircraft is going to transition from hovering to forward flight or vice versa. The lock is then released, which permits the wings and fuselage to rotate about the bearing. The wings are rotated (e.g., up or down) by selectively spinning up or down certain rotors while the fuselage stays substantially level as described above. Once the wings and/or fuselage are in their desired position, the lock is engaged.

In this example, the biplane has a vertical tail (112) and a horizontal tail (114). A vertical tail may be desirable for yaw stability and a horizontal tail may be desirable (at least for winged aircraft) for pitch stability. For these reasons, some embodiments may include a vertical tail and/or a horizontal tail.

In some embodiments, the left hand (port) and right hand (starboard) wings are not connected together which permits the wings to rotate independently of each other. This may be desirable in some applications in order to increase the available yaw control during hover (e.g., if the right wing rotates forward and the left wing rotates backwards, the aircraft will yaw left).

The following figure shows an example of how the exemplary aircraft of FIG. 1 changes from vertical flight (e.g., which is better for and/or more efficient at hovering) to horizontal flight (e.g., which is better for and/or more efficient at forward flight).

FIG. 1B is a diagram illustrating an embodiment of a biplane with a passively tilting fuselage changing from a hovering configuration to a forward flight configuration. FIG. 1B continues the example of FIG. 1A and shows the same exemplary biplane. Diagrams 150-153 shows the biplane at various points in time as the biplane transitions from a hovering configuration to a forward flight configuration.

As described above, the rotors of the biplane are selectively rotated at different speeds in order to change the flight mode or configuration. Generally speaking, the rotation of the rotors at different speeds induces external aerodynamic forces which cause the wings to "flip up" by flying the biplane forward and upward (e.g., along a curved path as shown in diagrams 150-153) into the forward flight position from the hovering position.

For example, diagram 150 shows the beginning positions of the fuselage (154a) and wings (156a). The fuselage is level and the rotors are rotated in a horizontal plane at that point in time. Later, in diagrams 151 and 152, the wings (156b and 156c) appear to have tilted slightly compared to their previous angle or position as the biplane continues its climb forward and upward. As shown in those diagrams, as the biplane flies along its path (and the wings appear to rotate), the fuselage (154b and 154c) passively remains level with respect to the ground because of the bearing and gravity. Finally, in diagram 153, the biplane has completed its forward and upward climb and the wings (156d) have rotated into the forward flight position even while the fuselage (154d) remains level with the ground. To put it another way, the upper and lower wings of the biplane wing follow different trajectories to forward flight. The wings do not (as an example) rotate while the biplane stays stationary.

This transition may be easier to conceptualize if it is imagined that the fuselage and wings are locked together (which is not what is shown in this figure). If the fuselage and wings were locked together and the rotors of the biplane were selectively rotated at the same speeds used to achieve the transition shown here, the biplane would end up with the rotors rotating in the vertical plane (as rotors 160d do in diagram 153) but with the fuselage facing downward. However, since the wings and fuselage can rotate with respect to each other because of the bearing, as the wings "fly around" the fuselage as is shown in diagrams 150-153, the fuselage passively maintains its level orientation relative to the ground.

The following figure describes process for changing flight modes in an aircraft with a passively tilting fuselage.

Figure 2:
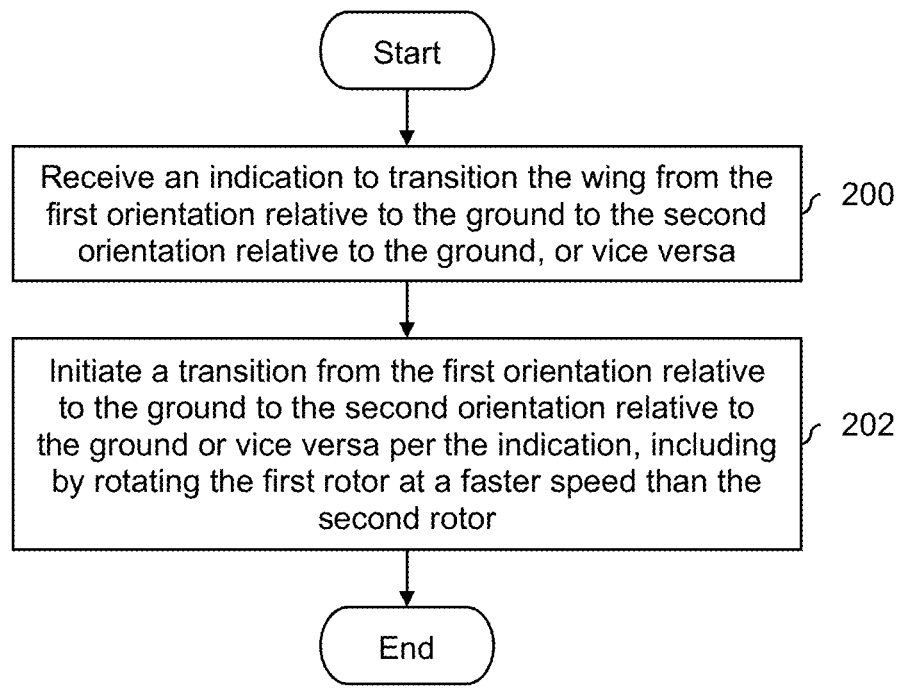
FIG. 2 is a flowchart illustrating an embodiment of a process to change flight modes in an aircraft with a passively tilting fuselage.

FIG. 2 is a flowchart illustrating an embodiment of a process to change flight modes in an aircraft with a passively tilting fuselage. For example, the exemplary biplane described above may switch modes or configurations according to this process, as well as other aircraft embodiments. In some embodiments, the process of FIG. 2 is performed by a flight controller (e.g., which receives instructions from a pilot and adjusts the appropriate aircraft configuration or setting).

At 200, an indication to transition the wing from the first orientation relative to the ground to the second orientation relative to the ground, or vice versa, is received. In some embodiments, the pilot controls wing position, including when to switch the wings from hovering to forward flight or vice versa, and the indication is received from or otherwise initiated by a pilot.

At 202, a transition from the first orientation relative to the ground to the second orientation relative to the ground or vice versa per the indication is initiated, including by rotating the first rotor at a faster speed than the second rotor. As described above, the rotors are rotated at different speeds in order to make the transition and the flight computer may adjust the various speeds of the rotors as appropriate for the desired transition. If needed, other controls are adjusted by the flight computer. For example, if the wings and fuselage are locked, then the flight computer unlocks the lock prior to the transition and locks the lock again after the transition is complete.

In some embodiments, a flight computer decides (e.g., independent of a pilot) when to transition. For example, the pilot could command a given speed and the flight computer can automatically choose the appropriate angle for the wing to fly at. Such embodiments may be desirable because it permits the pilot to focus on flying or maneuvering and relieves the pilot of the responsibility of deciding when to change flight modes or configurations. In some such embodiments, an aircraft has no degrees of freedom for the angle at which a wing is positioned. To put it another way, for a given speed (e.g., which is specified or set by the pilot), there is only one appropriate or proper angle at which the wing can be positioned and the flight computer selects that angle. In some embodiments, the aircraft is flown with the wing at some not perfectly exact 0° or 90° position (i.e., the wing is not perfectly upright or perfectly horizontal). Especially for forward flight, slight or moderate angling of the wing may be desirable and/or appropriate (e.g., based on the velocity set or specified by the pilot).

The following figures illustrate some other examples of an aircraft with a passively tilting fuselage with different wing and/or fuselage designs than shown above.

FIG. 3 is a diagram illustrating an embodiment of an aircraft with a passively rotating fuselage as well as an annular wing with interior and edge rotors. Diagram 300 shows a top view of the aircraft when the annular wing is in a hovering configuration (e.g., with the rotors rotating in the horizontal plane). This view shows that the annular wing (302) includes rotors which are completely inside a cylindrical volume created by the annular wing (e.g., rotors 304e and 304f) and rotors which are attached to the edge of the annular wing (e.g., rotors 304a-304d and 304g-304j). As described above, the rotors are attached in a fixed manner to the annular wing such that the angle and/or position of the rotors cannot change relative to the wing.

Diagram 320 shows a side view of the aircraft when the annular wing is in a forward flight configuration (e.g., with the rotors rotating in the vertical plane). In this example, the center of mass (322) is directly beneath the axis of rotation (306b), which is where the bearing connects the fuselage to the annular wing.

To rotate the annular wing from the forward flight position shown in diagram 320 to the hovering position shown in diagram 300, the rotors are selectively rotated at different speeds in order to create a differential. For example, if the rotors are assigned to one of the three groups, the following relative rotational speeds may be used. Naturally, the rotors may be grouped in some other manner in order to rotate the annular wing.

TABLE 1

Example relative rotors speeds to transition from forward flight mode to hovering mode for FIG. 3.

| Rotates the Slowest | Median Speed | Rotates the Fastest |
|---|---|---|
| Rotors 304a-304d | Rotors 304e and 304f | Rotors 304g-304j |

Rotating the rotors at different speeds per Table 1 (or some other combination of relative speeds) causes the aircraft as a whole to fly a forward path as the annular wing rotates down when the aircraft is viewed from inside the cockpit and going from a hovering to a forward flight mode. This moves the annular wing from the hovering configuration shown in diagram 300 to the forward flight configuration shown in diagram 320. It is noted that the rotation of the annular wing (e.g., when the aircraft is viewed from inside the cockpit) when the aircraft is transitioning from forward flight to hovering is the opposite as when the opposite transition occurs.

Although not shown in diagram 320, the crossbars (e.g., running from the annular wing to the bearing and/or side of the fuselage) extend from the leading edge of the annular wing (e.g., where the rotors are attached) to the trailing edge of the annular wing. This permits the crossbars to act like wings in forward flight mode which may further improve the performance of the aircraft in forward flight mode.

Diagram 340 shows a side view of the aircraft when the annular wing is in a hovering configuration. To transition from the forward flight configuration to the hovering configuration, the opposite of Table 1 may be used. In some embodiments, a wing is thinner on the front side to mitigate obstruction of the pilot's view (e.g., when the wing is in hovering mode). In some embodiments, the wing is (e.g., in addition to or as an alternative to using a thinner wing) placed at an angle so that it is always below the pilot's vision in the front. For example, the wing may be tilted down a bit, but all of the rotors are facing straight up in hovering mode.

FIG. 4 is a diagram illustrating an embodiment of an annular wing with rotors attached only to the edge of the annular wing. Although not shown here, a passively tilting fuselage may be used in combination with the example annular wing. In this example, a top view of an alternate arrangement of rotors (e.g., compare to the previous figure) on an annular wing is shown. In this arrangement, all of the rotors (400) are attached to the edge of the annular wing (402). This arrangement of rotors may be desirable because it helps blow air over the wing, increasing its lift during early transition and making transition somewhat easier. Also, unlike the annular wing shown in the previous figure, this annular wing has no cross bar running along the axis of rotation. In some applications this may be desirable because it reduces the cost and/or weight of the wing.

FIG. 5 is a diagram illustrating an embodiment of an aircraft with an annular wing with rotors attached only to the crossbars of an annular wing. Diagram 500 shows a top view of the exemplary annular wing (502) when the wing is in a hovering configuration. In this example, all of the rotors (504) are attached to a crossbar (506) of the annular wing, such that all of the rotors are inside the cylindrical volume created by the annular wing. This example is also different from the previous example, in that the fuselage (508) of the aircraft fits within the annular wing. Note, for example, that diagram 500 shows that the tail of the fuselage (508) does not extend outside of the annular wing (502) when in the hovering configuration shown in diagram 500. Line 510 shows the axis of rotation where the fuselage and annular wing rotate with respect to each other.

Diagram 520 shows a front view of the aircraft when the wing is in a hovering configuration (e.g., similar to diagram 500). For clarity, the crossbar (506) shown in diagram 520 is shaded where the crossbars extend from almost the leading edge of the annular wing to the trailing edge of the annular wing. Since the rotors in this example are inside of the cylindrical volume created by the annular wing, the leading edge of the crossbars are not flush with the leading edge of the annular wing so that the rotors can fit within the cylindrical volume. As described above, the depth of the crossbars (e.g., how they extend from almost the leading edge of the annular wing to the trailing edge of the annular wing) permits the crossbars to act as wings and contributes to the lift of the aircraft when the wing is in a forward flight configuration. Line 510 shows the axis of rotation where the fuselage 508 and annular wing (502, including the attached crossbar (506) and rotors (504)) are able to rotate with respect to each other. To enter into forward flight configuration from the view shown in diagram 520, the rotors may be rotated at different speeds as described above.

One benefit to this design is that all of the rotors are shielded by the annular wing. For example, if the aircraft is on the ground with the annular wing in the hovering configuration and the rotors spinning, someone walking by will not be hit by the rotors because the annular wing acts as a shield.

Another benefit is that with the rotors shielded by the annular wing, the walls of the annular wing act to at least partially block or reflect the noise created by the rotors. If the rotors were instead visible over the annular wing then the noise created by the rotors would not be blocked by the annular wing.

FIG. 6 is a diagram illustrating an embodiment of a top view and front view of an aircraft with an H-wing and a passively tilting fuselage. Diagram 600 shows a top view of the exemplary aircraft. As shown from that view, the H-wing (602) has eight rotors (604) attached to it, four on each side. The fuselage (606) and H-wing (602) are attached via a bearing (608) which permits the fuselage and H-wing to rotate with respect to each other about the axis of rotation (610).

As described above, the rotors are rotated at different speeds in order to transition from a hovering configuration to a forward flight configuration (or vice versa). For example, to go from a hovering configuration to a forward flight configuration (not shown in this figure), the four rotors closest to the nose may be rotated the slowest, the two center rotors may be rotated at a faster speed, and the four rotors closest to the tail may be rotated at an even faster speed. This would create a lift differential which would cause the H-wing to rotate into the forward flight configuration (e.g., by causing the H-wing to fly into the forward flight position or configuration). The bearing (610) permits the fuselage to passively rotate so that the fuselage remains level with the pilot in an upright position.

Diagram 620 shows a front view of the aircraft, still in hovering mode. Although not shown in this figure, in some embodiments, the bottom of the wing (e.g., facing downward in diagram 620) and/or the bottom of the fuselage is/are designed to come into contact when the ground when landing. For example, the contact point(s) may be made of a flexible material which is designed to soften the landing, be durable enough for repeated takeoffs and landings without wearing out, and/or be "grippy" enough to prevent sliding on a slope. Similarly, the design at the contact point(s) may be designed to accommodate uneven surfaces, water landings, etc.

It is noted that the drawing is not to scale and in various embodiments a variety of different dimensions (e.g., span, length, etc.) may be used. For example, as shown in diagram 600, the length of the fuselage is shorter than the length of the H-wing. In some other embodiments, the fuselage is longer than the H-wing (or some other type of wing). Similarly, the number and placement of rotors on the H-wing is merely exemplary and is not intended to be limiting.

FIG. 7 is a diagram illustrating side views of an exemplary H-wing aircraft with rotors attached to the wings via dowels. Diagram 700 shows a side view where the wing (702) is in a forward flight configuration. In this example, the rotors (704) are attached to the wing via a post or dowel (706) which elevates the rotor above the wing.

Diagram 720 shows a side view where the wing is in a hovering configuration. As shown in this view, the blades of the rotor are foldable (722), for example, to make it easier for the pilot to get in and out of the aircraft. As shown in this diagram, when the blades are folded down, the additional elevation or separation offered by the prop (706) prevents the blades from hitting the wings. The wings and/or blades of the rotor may be susceptible to breaking or chipping and it may be desirable to have them not come into contact when the rotor starts up (spins down) and/or the blades are folded.

Diagram 740 shows a front view of the exemplary aircraft when the wings are in a forward flight configuration.

FIG. 8 is a diagram illustrating a variety of aircraft with different types of rotor placements. In this example, top views are shown with the wings in hovering mode. Diagram 800 shows an aircraft with six rotors (802). On each side of the aircraft, a wing (804) extends outward with a pair of rotors closest to the fuselage (mounted on a crossbeam) and a single rotor at the tip of the wing. In this example, the wing is wider where it connects to the bearing and narrower at the tip of the wing.

Diagram 820 shows a similar rotor configuration as diagram 800 except with 10 rotors instead of six. Although not shown in diagram 800 or diagram 820, the size of the bearing may match the width of the wing where it meets the fuselage. In some applications, this design choice is desirable because it is more structurally stable.

Diagram 840 shows an aircraft with a tree-like wing. In this example, the wing (844) has a tree-like structure where rotors (842) are placed on a main "trunk" or at the ends of "branches" which branch out from the trunk (e.g., extending outward from the bearing or fuselage). In some applications, this design choice is desirable because it presents less wind resistance when the wing is in forward flight mode.

Diagram 860 shows an aircraft with rotors mounted in a circle using two pairs of crossbars: two running horizontally and two running vertically.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
  a wing, wherein a first rotor and a second rotor are coupled to the wing at a fixed position relative to the wing;
  a fuselage;
  a bearing, wherein:
    the bearing mechanically couples the wing and the fuselage and permits the wing and the fuselage to rotate with respect to each other about an axis of rotation;
    the bearing permits the fuselage to passively rotate under the influence of gravity to be in a same orientation relative to ground when the wing is in a first orientation relative to the ground as well as a second orientation relative to the ground; and
  a lock which is configured to:
    when engaged, prevent the wing and the fuselage from rotating about the axis of rotation with respect to each other; and
    when released, permit at least one of the wing and the fuselage to rotate about the bearing, including when the aircraft transitions between a hover mode and a forward flight mode.

2. The aircraft recited in claim 1, wherein a center of mass associated with the fuselage is lower than the bearing.

3. The aircraft recited in claim 1, wherein the wing includes one or more of the following: a biplane wing, an annular wing, or an X-wing.

4. The aircraft recited in claim 1 further comprising a damper which slows the rotation of the at least the fuselage about the axis of rotation.

5. The aircraft recited in claim 1, wherein:
  the wing includes an annular wing; and
  the first rotor and the second rotor are completely inside the annular wing.

6. The aircraft recited in claim 1 further comprising a dowel, wherein the first rotor is attached to a first end of the dowel and the wing is attached to a second end of the dowel.

7. The aircraft recited in claim 1 further comprising a dowel, wherein:
  the first rotor is attached to a first end of the dowel and the wing is attached to a second end of the dowel;
  the first rotor includes one or more blades which are foldable; and
  the length of the dowel prevents the blades, when folded, from touching the wing.

8. The aircraft recited in claim 1, wherein the first orientation is associated with horizontal flight and the second orientation is associated with vertical flight.

9. The aircraft recited in claim 1, wherein the first orientation is associated with forward flight and the second orientation is associated with hovering.

10. The aircraft recited in claim 1 further comprising a flight computer configured to:

receive an indication to transition the wing from the first orientation relative to the ground to the second orientation relative to the ground, or vice versa; and initiate a transition from the first orientation relative to the ground to the second orientation relative to the ground or vice versa per the indication, including by rotating the first rotor at a faster speed than the second rotor.

11. The aircraft recited in claim 1, wherein the fuselage rotates relative to the wing passively without hydro-mechanical actuators.

* * * * *

UNITED STATES PATENT AND TRADEMARK OFFICE
CERTIFICATE OF CORRECTION

PATENT NO. : 10,252,796 B2
APPLICATION NO. : 15/232606
DATED : April 9, 2019
INVENTOR(S) : Todd Reichert Page 1 of 1

It is certified that error appears in the above-identified patent and that said Letters Patent is hereby corrected as shown below:

In Page 2, Item (56), References Cited, Other Publications, delete:
"Author Unknown, Tiltwing, from Wikipedia, the free encyclopedia, downloaded from https://en.Wikipedia.orgiwiki/Tiltwing, last modified May 26, 2015."

And insert:
--Author Unknown, Tiltwing, from Wikipedia, the free encyclopedia, downloaded from https://en.Wikipedia.org/wiki/Tiltwing, last modified May 26, 2015.--, therefor.

Signed and Sealed this
Nineteenth Day of November, 2019

Andrei Iancu
*Director of the United States Patent and Trademark Office*